(12) United States Patent
Green et al.

(10) Patent No.: US 9,550,457 B2
(45) Date of Patent: Jan. 24, 2017

(54) ELECTRO-OPTIC DEVICE WITH ULTRASONIC SOLDER BUS

(71) Applicant: Gentex Corporation, Zeeland, MI (US)

(72) Inventors: Kristopher R. Green, Allendale, MI (US); Joel A. Stray, Hudsonville, MI (US); William L. Tonar, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 14/849,948

(22) Filed: Sep. 10, 2015

(65) Prior Publication Data
US 2016/0075284 A1   Mar. 17, 2016

Related U.S. Application Data

(60) Provisional application No. 62/049,122, filed on Sep. 11, 2014.

(51) Int. Cl.
*G02F 1/03*      (2006.01)
*G02F 1/15*      (2006.01)
(Continued)

(52) U.S. Cl.
CPC .............. *B60R 1/088* (2013.01); *G02F 1/0107* (2013.01); *G02F 1/1339* (2013.01); *G02F 1/153* (2013.01);
(Continued)

(58) Field of Classification Search
CPC ........ G02F 1/01; G02F 1/0102; G02F 1/0107; G02F 1/03; G02F 1/335; G02F 1/133553; G02F 1/15; G02F 1/1533; G02F 1/155; G02F 1/157; B60R 1/08; B60R 1/088; B60R 1/082; B60R 1/10; B60R 1/12; B60R 1/1207; B60R 2001/1215
(Continued)

(56) References Cited

U.S. PATENT DOCUMENTS 3,992,082  A    11/1976  Katz
5,130,831  A     7/1992  Kohara et al.
(Continued)

FOREIGN PATENT DOCUMENTS

WO    2004031840 A2    4/2004

OTHER PUBLICATIONS

International Searching Authority, Notification of Transmittal of the International Search Report and Written Opinion re: PCT/US2015/049677, Dec. 3, 2015, 9 pages, Moscow, Russia.

*Primary Examiner* — Loha Ben
(74) *Attorney, Agent, or Firm* — Price Heneveld LLP; Bradley D. Johnson

(57) ABSTRACT

An electro-optic assembly is provided that includes a first substantially transparent substrate comprising: a first surface, a second surface, and a first peripheral edge, the second surface comprises a first electrically conductive layer and a first isolation area. The assembly further includes a second substrate comprising: a third surface, a fourth surface, and a second peripheral edge, the third surface comprises a second electrically conductive layer. The assembly also includes a primary seal between the second and third surfaces, wherein the seal and the second and third surfaces define a substantially hermetic cavity; an electro-optic medium at least partially disposed in the cavity; and an electrically conductive solder that is disposed on at least portions of at least one of the first and second peripheral edges in electrical contact with one of the first and second electrically conductive layers.

22 Claims, 4 Drawing Sheets

(51) Int. Cl.
  *B60R 1/08*    (2006.01)
  *G02F 1/01*    (2006.01)
  *G02F 1/1339*  (2006.01)
  *G02F 1/153*   (2006.01)
  *G02F 1/155*   (2006.01)
  *G02F 1/157*   (2006.01)
  *G02F 1/161*   (2006.01)

(52) U.S. Cl.
  CPC ............ *G02F 1/155* (2013.01); *G02F 1/157* (2013.01); *G02F 1/161* (2013.01)

(58) Field of Classification Search
  USPC .......... 359/245, 247, 252, 253, 265–274, 315,359/318; 349/73, 74, 84, 113, 153, 158
  See application file for complete search history.

(56) References Cited

U.S. PATENT DOCUMENTS

| | | | |
|---|---|---|---|
| 7,064,882 B2 | 6/2006 | Tonar et al. | |
| 7,184,190 B2* | 2/2007 | McCabe | B60R 1/12 359/238 |
| 7,310,177 B2* | 12/2007 | McCabe | G02F 1/157 359/238 |
| 7,324,261 B2 | 1/2008 | Tonar et al. | |
| 7,372,611 B2 | 5/2008 | Tonar et al. | |
| 7,379,225 B2 | 5/2008 | Tonar et al. | |
| 7,542,193 B2* | 6/2009 | McCabe | B60R 1/088 359/247 |
| 7,570,413 B2 | 8/2009 | Tonar et al. | |
| 7,602,542 B2 | 10/2009 | Tonar et al. | |
| 7,710,631 B2* | 5/2010 | McCabe | G02F 1/157 359/238 |
| 7,719,750 B2 | 5/2010 | Tonar et al. | |
| 7,978,393 B2* | 7/2011 | Tonar | B60R 1/088 359/265 |
| 8,004,741 B2 | 8/2011 | Tonar et al. | |
| 8,169,684 B2 | 5/2012 | Bugno et al. | |
| 8,638,488 B2 | 1/2014 | Tonar et al. | |
| 8,665,510 B2* | 3/2014 | Uken | B60R 1/088 359/245 |
| 8,988,755 B2* | 3/2015 | McCabe | B60R 1/08 359/245 |
| 8,988,756 B2* | 3/2015 | Agrawal | G02F 1/161 359/267 |
| 9,041,998 B2 | 5/2015 | Tonar et al. | |
| 9,205,780 B2* | 12/2015 | Habibi | B60R 1/08 |
| 2006/0245026 A1 | 11/2006 | Tonar et al. | |

\* cited by examiner

ELECTRO-OPTIC DEVICE WITH ULTRASONIC SOLDER BUS

CROSS REFERENCE TO RELATED APPLICATIONS

The present application claims the benefit of priority under 35 U.S.C. §119(e) from U.S. Provisional Patent Application No. 62/049,122 filed on Sep. 11, 2014, and titled "ELECTRO-OPTIC DEVICE WITH ULTRASONIC SOLDER BUS," the content of which is relied upon and incorporated herein by reference in its entirety.

FIELD

The present invention generally relates to electro-optic assemblies, including rearview display devices and variable transmissivity windows.

BACKGROUND

Electro-optic assemblies are being used in various vehicular and building applications, e.g., within rearview display devices and variable transmissivity windows. Use of these assemblies in various applications can be limited by cost, aesthetic and functional considerations. Interconnections between the electrodes within these assemblies and the underlying circuitry in the devices containing these assemblies can be complex and costly in terms of materials and processing. Accordingly, new electro-optic assembly designs, configurations and assemblies, along with methods of making them, are needed particularly in view of reducing material and processing costs associated with interconnections, and improving aesthetics and/or enhancing functionality of the assemblies.

BRIEF SUMMARY

According to one aspect of the disclosure, an electro-optic assembly is provided that includes a first substantially transparent substrate comprising: a first surface, a second surface, and a first peripheral edge, the second surface comprises a first electrically conductive layer and a first isolation area separating portions of the first electrically conductive layer. The assembly further includes a second substrate comprising: a third surface, a fourth surface, and a second peripheral edge, the third surface comprises a second electrically conductive layer. The assembly also includes a primary seal between the second and third surfaces, wherein the seal and the second and third surfaces define a substantially hermetic cavity; an electro-optic medium at least partially disposed in the cavity; and an electrically conductive solder that is disposed on at least portions of at least one of the first and second peripheral edges in electrical contact with one of the first and second electrically conductive layers.

In certain aspects, the first isolation area defines a region on the second surface in which the first electrically conductive layer has been masked or is completely ablated. Accordingly, the isolation area may define one or more portions of the first electrically conductive layer.

According to an aspect of the disclosure, an electro-optic assembly is provided that includes: a front substrate having a front substrate peripheral edge, a first surface and a second surface substantially parallel to the first surface, wherein the second surface comprises a first electrically conductive layer and a first isolation area separating portions of the first electrically conductive layer. The assembly further includes a rear substrate spaced from and arranged substantially parallel to the front substrate, the rear substrate having a rear substrate peripheral edge, a third surface and a fourth surface substantially parallel to the third surface, wherein the third surface comprises a second electrically conductive layer. The assembly also includes a primary seal between the second and third surfaces, wherein the seal and the second and third surfaces define a substantially hermetic cavity; an electro-optic medium at least partially disposed in the cavity; and an electrically conductive solder that is disposed on at least portions of at least one of the front and rear substrate peripheral edges in electrical contact with one of the first and second electrically conductive layers. Further, the substrates are arranged such that at least a portion of one of the second and third surfaces comprises an offset region.

According to an additional aspect of the disclosure, a vehicular rearview assembly having a front portion includes a front substrate having a front substrate peripheral edge, a first surface and a second surface substantially parallel to the first surface, wherein the second surface comprises a first electrically conductive layer and a first isolation area separating portions of the first electrically conductive layer. The assembly further includes a rear substrate spaced from and arranged substantially parallel to the front substrate, the rear substrate having a rear substrate peripheral edge, a third surface and a fourth surface substantially parallel to the third surface, wherein the third surface comprises a second electrically conductive layer. The assembly also includes a primary seal between the second and third surfaces, wherein the seal and the second and third surfaces define a substantially hermetic cavity; an electro-optic medium at least partially disposed in the cavity; a housing structure having an aperture corresponding to the front portion of the vehicular rearview assembly, wherein at least a portion of the housing structure is configured to support at least one of the substrates; and an electrically conductive solder that is disposed on at least portions of at least one of the front and rear substrate peripheral edges in electrical contact with one of the first and second electrically conductive layers. Further, the substrates are arranged such that at least a portion of one of the second and third surfaces comprises an offset region.

These and other features, advantages, and objects of the present invention will be further understood and appreciated by those skilled in the art by reference to the following specification, claims, and appended drawings.

BRIEF DESCRIPTION OF THE DRAWINGS

The disclosure will become more fully understood from the detailed description and the accompanying drawings, wherein.

DETAILED DESCRIPTION

Figure 1:
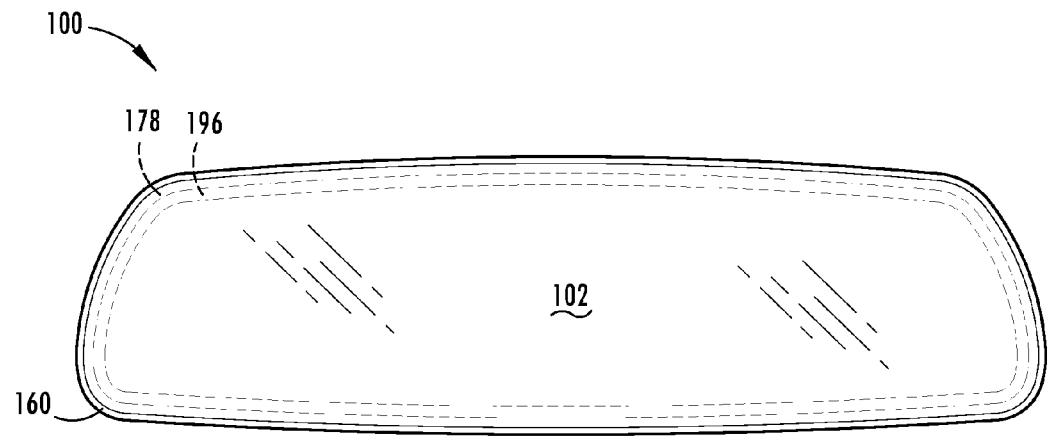
FIG. 1 is a top-down, plan view of an electro-optic assembly, in accordance with one aspect of the disclosure.

The present illustrated embodiments reside primarily in combinations of method steps and apparatus components related to electro-optic assemblies. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 2:
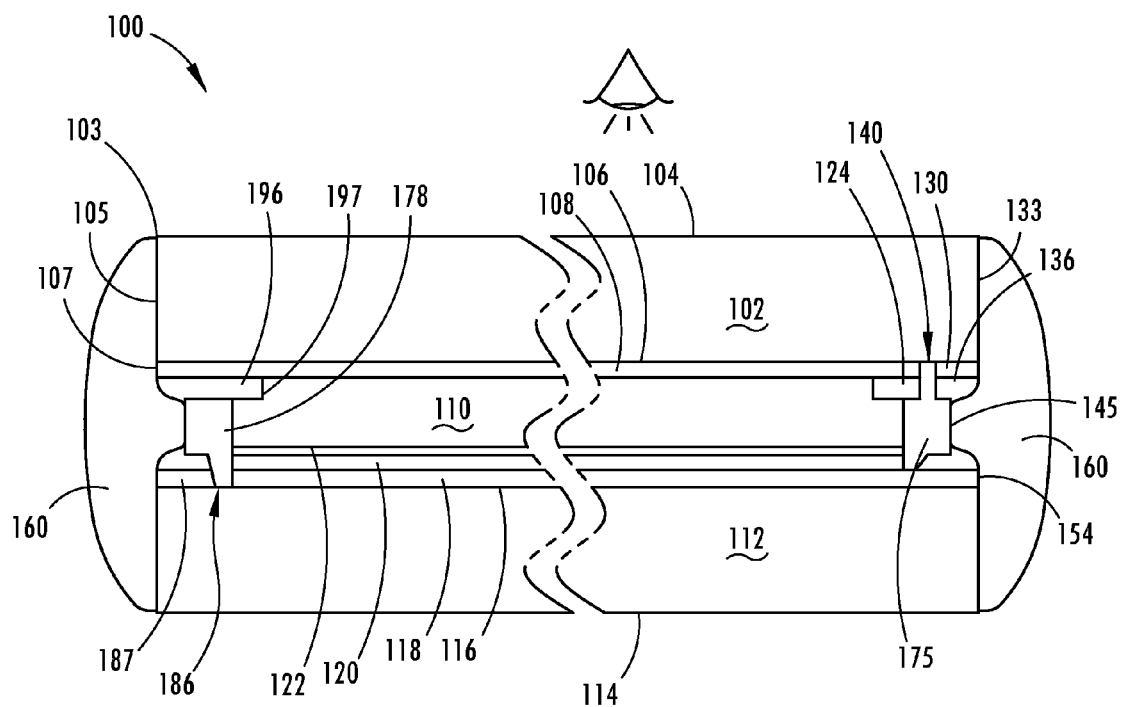
FIG. 2 is a cross-sectional view of the electro-optic assembly depicted in FIG. 1.

In reference to FIGS. 1-2, an electro-optic assembly is generally shown at referenced identifier 100. FIG. 1 depicts an electro-optic assembly 100 as viewed toward a first substrate 102 (also referred herein as a "front substrate") in a plan view with a spectral filter 196 positioned between the viewer and a primary seal 178. Further, an electrically conductive solder 160 is applied to the edge of the assembly 100, outboard from the primary seal 178. Preferably, solder 160 comprises a lead-free composition. The primary seal 178, as used herein in this disclosure, may include a plug (not shown) that is affixed within the assembly 100 after the electro-optic medium 110 is filled within the assembly 100. It should be understood that the primary seal 178 may be applied by means commonly used in the LCD industry such as by silk-screening or dispensing. Using these techniques, the primary seal 178 may be applied to an individually cut-to-shape substrate or it can be applied as multiple primary seal shapes on a large substrate. In some aspects, the large substrate with multiple primary seals applied may then be laminated to another large substrate and the individual mirror shapes can be cut out of the laminate after at least partially curing the primary seal 178. Electro-optic devices, such as assemblies 100, can be made using a similar process. All coatings such as the transparent conductors, reflectors, spectral filters and in the case of solid state electro-optic devices the electro-optic layer or layers may be applied to a large substrate and patterned if necessary. The coatings can be patterned using a number of techniques such as by applying the coatings through a mask, by selectively applying a patterned soluble layer under the coating and removing it and the coating on top of it after coating applicant, laser ablation or etching. These patterns can contain registration marks or targets that can be used to accurately align or position the substrates throughout the manufacturing process. This is usually done optically for instance with a vision system using pattern recognition technology. The registration marks or targets may also be applied to the glass directly such as by sand blasting, chemical etching, laser or diamond scribing if desired.

FIG. 2 depicts an electro-optic assembly 100, which is a view of the assembly depicted in FIG. 1 to provide greater detail. Assembly 100 comprises a first substrate 102 having a first surface 104 and a second surface 106. A first conductive portion 108 and a second conductive portion 130 applied to the second surface 106 are substantially electrically insulated from one another via a first isolation area 140. As can be seen, in at least one embodiment the isolation area can be located such that it is on top of the conductive portions 108 and 118 and is electrically isolating, thus preventing conductive portions 108, 118 from being in electrical contact with each other. As such, the first isolation area 140 may be thus defined without removing portions of electrode materials on the second and third surfaces 106, 116. Spectral filter 196, and spectral filter portions 124, 136, can also be electrically insulating materials to electrically isolate conductive portion 108 from conductive portion 118.

Referring to FIG. 2, non-conductive spacing media (including conductive spacers in certain implementations) for controlling the spacing between the laminated substrates may be placed into the primary seals 175, 178 or applied to a substrate 102, 112 (also referred herein as a "front substrate" and a "rear substrate," respectively) prior to lamination into an electro-optic assembly 100. In some aspects, the spacing media or means may be applied to areas of the laminate that will be cut away from the finished, mirror assemblies according to certain manufacturing operations for the electro-optic assemblies 100.

In FIG. 2, a portion of the first isolation area 140 is shown to be extending parallel within a portion of the primary seal 175 located near the center thereof. It should be understood that the primary seal 175, as used herein within this disclosure, may also include a plug (not shown) that is introduced after the electro-optic medium 110 is filled within the assembly 100. It should be understood that this portion of the isolation area 140 may lie such that a viewer would not readily perceive a line within the spectral filter 196; for example, a portion of the isolation area 140 may be substantially aligned with an inboard edge of the spectral filter portion 124. It should be understood that when any portion of the isolation area 140 is located inboard of the primary seal 175, a discontinuity in the electro-optic material coloring and, or, clearing may be observed. This operational characteristic may be manipulated to derive a subjectively visually appealing element. The isolation area 140 may also be of a dimension smaller than the eye can readily see, e.g., less than 10 µm wide.

Still referring to FIG. 2, the electro-optic assembly 100 is depicted to comprise a second substrate 112 having a third surface 116 and a fourth surface 114. It should be noted that the first substrate 102 may be larger than the second substrate 112 to create an offset along at least a portion of the perimeter of the assembly (or vice versa). Third and fourth conductive electrode portions 118, 187, respectively, are shown proximate the third surface 116 substantially electrically insulated via second isolation area 186. A portion of the second isolation area 186 is shown to be extending parallel within a portion of the primary seal 178 located near the center thereof. It should be understood that this portion of the isolation area 186 may lie such that a viewer would not readily perceive a line within the spectral filter material; for example, a portion of the second isolation area 186 may be substantially aligned with an inboard edge 197 of the spectral filter 196. In some implementations, the isolation area 186 may extend to the outboard edge of substrate 112 in such a way as to eliminate electrode portion 187. As further shown in FIG. 2, a reflective material 120 may be applied between an optional overcoat 122 and the third conductive portion 118.

With further reference to FIG. 2, the first isolation area 140 cooperates with a portion of the primary seal 175 to define the second conductive electrode portion 130 and the second spectral filter material portion 136, each substantially electrically insulated from the first conductive electrode portion 108 and the first spectral filter portion 124. This configuration allows for placement of an electrically conductive solder 160 adjacent to and in contact with the primary seal 175 such that the solder 160 is further in electrical communication with the third conductive electrode portion 118, the second conductive electrode portion 130, the reflective material 120, the optional overcoat 122 and the electro-optic medium 110. Preferably, the material, or composition of materials, forming the third conductive electrode portion 118 and the electrically conductive solder 160 are chosen to promote durable electrical communication to the materials leading to the electro-optic medium 110. In some aspects, the primary seal 175 is contained to average widths of less than or equal to 2.5 mm, to 2.4 mm, to 2.3 mm, to 2.2 mm, to 2.1 mm, to 2.0 mm, to 1.9 mm, to 1.8 mm, to 1.7 mm, to 1.6 mm, or less than or equal to 1.5 mm. The spectral filter portions 124, 136 can be larger in average cumulative width than the width of the primary seal 175 in some aspects.

Referring again to FIG. 2, the second isolation area 186 cooperates with a portion of the primary seal 178 to define the fourth conductive electrode portion 187 (if present) that is substantially electrically insulated from the third conductive electrode portion 118, the reflective layer 120, the optional overcoat 122 and the electro-optic medium 110. This configuration allows for placement of an electrically conductive solder 160 adjacent to and in contact with the primary seal 178 such that the solder 160 is in electrical communication with the spectral filter 196, the first conductive electrode portion 108, the fourth conductive portion 187 (if present) and the electro-optic medium 110. Preferably, the material, or composition of materials, forming the first conductive portion 108, the fourth conductive portion 187 (if present), the spectral filter 196 and the electrically conductive solder 160 are chosen to promote durable electrical communication to the materials leading to the electro-optic medium 110. In some implementations, the primary seal 178 is contained to average widths of less than or equal to 2.5 mm, to 2.4 mm, to 2.3 mm, to 2.2 mm, to 2.1 mm, to 2.0 mm, to 1.9 mm, to 1.8 mm, to 1.7 mm, to 1.6 mm, or less than or equal to 1.5 mm. The spectral filter 196 can be slightly larger in average width than the width of the primary seal 178 in certain aspects.

The electrically conductive solder 160 can be selected according to some implementations of the electro-optic assembly 100 such that the resulting visible edge surface of first substrate 102 is visually appealing and such that good adhesion is obtained at the edges of the substrates, e.g., interfaces 133, 145, and 154. It should also be understood that at least a portion of the first substrate 102 in the areas proximate its corners, e.g., first corner 103, the edge 105, the second corner 107 and combinations thereof, may be treated to smooth protrusions and depressions noticeable to a viewer.

Referring to FIGS. 3A-3D, primary seal portions of the electro-optic assembly 100 shown in FIGS. 1 and 2 are shown in an enlarged, cross-sectional format to provide additional detail associated with salient features of the various, exemplary embodiments of this disclosure. More specifically, electro-optic assemblies 100 are depicted in FIGS. 3A-3D, respectively, according to various exemplary aspects of the disclosure related to configurations of the primary seal 178. The primary seal 178 (along with the primary seal 175 depicted in FIG. 2) is configured to seal the electro-optic medium 110 between the substrates 102, 112. Further, an electrically conductive solder 160 is configured to be substantially electrically conductive, arranged in contact with the electrode portions of the assembly 100. The solder 160 may also augment or otherwise function in combination with the primary seals 175, 178 to provide the required level of hermeticity for the cavity containing the electro-optic medium 110.

Advantageously, the electro-optic assembly configurations according to aspects of the disclosure are associated with an electro-optic assembly design that does not require conductive epoxies or the like for making electrical connections between the electrodes of the assemblies and the electro-optic medium. Cost savings are realized as conductive epoxies (and typical alternatives) often contain expensive precious metals, including gold or silver. An additional advantage is that the use of the electrically conductive solder as an electrical connection can eliminate the need for electrical contacts, clips or the like in connecting the assembly to a printed circuit board (PCB) within the device employing the electro-optic assembly 100. Put another way, the electrically conductive solder 160 can serve as the interconnection between the PCB and the electrode portions of the electro-optic assembly. A flat or round wire, metal strip, metal pin, formed metal stamping, or flexible circuit can be soldered directly to the solder bus to interconnect to the PCB. There are also some manufacturing-related cost savings that can be realized with the use of electrically conductive solder 160 to form interconnections at the end of assembly processes for the assemblies 100. In addition, no post-curing processes are required as with some electrically conductive adhesives to achieve final material properties.

Figure 3A:
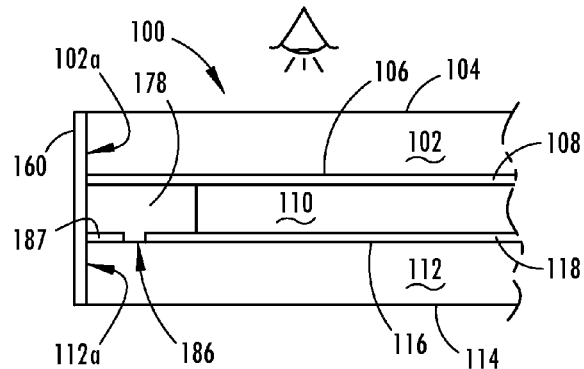
FIG. 3A is an enlarged, cross-sectional view of the electro-optic assembly depicted in FIG. 2, in accordance with one aspect of the disclosure.

Referring to FIG. 3A, an electro-optic assembly 100 is provided that includes a first substrate 102 comprising: a first surface 104, a second surface 106, and a first peripheral edge 102a, the second surface 106 comprises a first electrically conductive layer 108, 130 and a first isolation area 140 separating portions of the first electrically conductive layer 108, 130 (see also FIG. 2). The assembly 100 further includes a second substrate 112 comprising: a third surface 116, a fourth surface 114, and a second peripheral edge 112a, the third surface 116 comprises a second electrically conductive layer 187, 118 and a second isolation area 186 separating portions of the second electrically conductive layer 187, 118 (see also FIG. 2). It should be understood that substrate 112 is substantially transparent when the assembly 100 is employed in a window application. The assembly 100 also includes primary seals 175, 178 between the second and third surfaces, 106 and 116, respectively, wherein the seals 175, 178 and the second and third surfaces 106 and 116 define a substantially hermetic cavity; an electro-optic medium 110 at least partially disposed in the cavity; and an electrically conductive solder 160 that is disposed on at least portions of at least one of the first and second peripheral edges 102a and 112a, respectively, in electrical contact with one of the first and second electrically conductive layers 108, 118, 130 and 187.

In some implementations, the electrically conductive solder 160 is disposed between or near the edges of the second and third surfaces 106 and 116, respectively, to define a portion of the substantially hermetic cavity containing the electro-optic medium 110. In these aspects, the electrically conductive solder 160 serves to augment or otherwise improve the hermeticity of the primary seals 175, 178 by retarding the permeation of degrading materials such as oxygen and water vapor into the cavity holding the electro-optic medium 110. It is preferred that the solder 160-primary seal 175, 178 combination extend around as much of the perimeter of the electro-optic assembly 100 as possible, e.g., with at least 70% coverage. Coverage of at least 80% is more preferable, and coverage of at least 90% is even more preferable. An advantage of these configurations is that the seals 175, 178 can be configured with a smaller volume, thus reducing material costs and reducing the likelihood of unsightly lines and demarcations associated with the seals that might otherwise be observable from outside of the assembly (e.g., the driver or passenger in a vehicle containing such an electro-optic assembly configured as a display device).

The electrically conductive solder 160 can be comprised of various solder compositions suitable for ultrasonic soldering process methods and manufacturing steps. Preferably, the solder 160 comprises a lead-free composition. In some aspects, the solder 160 can have a composition comprising at least 90% Sn, 1% Zn and 1% Sb by weight. Exemplary compositions for the solder 160 include: (a) 94-95% Sn, 3-5% Sb and 1-3% Zn by weight; (b) 93.5-94.5% Sn, 3-5% Zn, 0.7-1.3% Sb, 0.8-1.2% Ag, 0.01% Al (+/−0.003%), 0.01% Ge (+/−0.003%), 0.005% Si (+/−0.002%) and 0.005% Ti (+/−0.002%) by weight; and (c) 90-100% Sn, up to 5% Sb and 1-5% Zn by weight. Other compositions for solder 160 are feasible, depending on the composition and/or surface treatments of the electrodes and substrate surfaces that the solder 160 will be bonded to including, but not limited to, solder compositions containing one or more of In, Bi, Cr, Ru, Ag, Cu, Ga, Zn, Sb, Au, and/or alloys of these elements. Compositions for solder 160 should also be selected in view of the thermal expansion coefficient of the substrate 102, 112.

In general, ultrasonic processes can be employed to deposit or otherwise form the solder 160 at the desired locations within the electro-optic assemblies 100. For example, an ultrasonic soldering tip (e.g., as employed in an ultrasonic soldering unit sourced from Japan Unix Co., Ltd., MBR Electronics GmbH, and others) can be placed in contact with a soldering composition directed to desired locations within the assembly 100. The tip can then be used to vibrate the soldering composition and to clean the surface to be bonded to the solder 160, thereby removing any oxidized layers present in the joint region of the soldering composition. The soldering unit also includes a heat source that provides energy to melt the solder. In particular, the energy provided by the heat source should be set to result in a higher temperature than the melt point of the particular composition selected for the solder 160. In some aspects, the energy should be adjusted to result in a temperature to drive the feed rate of the ultrasonic soldering process. The amount of ultrasonic energy applied from the tip can influence the bonding between the solder 160 and the substrates of the electro-optic assembly 100. The composition of the substrates 102, 112 (e.g., having a particular glass composition), surface chemistry, and surface roughness can all influence the bonding between the substrate 160 and the substrates 102, 112. Metallic coatings, such as those comprising chromium, molybdenum, nickel, rhodium, ruthenium, silver and/or gold, chrome, stainless steel, combinations thereof, and/or alloys thereof can be applied to the glass to enhance solder wetting and adhesion. Cavitation within the solder can lead to strong bonds between underlying glass (e.g., substrates 102, 112) and the solder 160. According to aspects of this disclosure, solder joints containing solder 160 in electrical contact with the electrodes disposed on the second and third surfaces 106, 116 of the substrates 102, 112 can be obtained with low electrical resistance levels. Preferably, these solder joints have electrical resistance levels of 5 ohms or less, even more preferably 3 ohms or less, and even more preferably 1 ohm or less across their length or, otherwise, longest dimension.

The ultrasonic soldering tip employed to deposit or otherwise form the electrically conductive solder 160 is preferably no wider than 50% wider than the desired solder width. Preferably, the surface area of the tip is maximized to improve wetting of the solder to the substrate being soldered. A flat tip contact surface is preferable. It is also preferable to employ a tip shaped similarly to the substrate surface that is being soldered. For example, the ultrasonic tip can be shaped to match or roughly approximate the morphology of the substrate surface that is being soldered. The distance or height between the ultrasonic tip to the substrate can also be an important parameter to control in some implementations. In some aspects, the distance between the tip and the substrate is set to about 100 microns. In other aspects, this distance is set to less than about 100 microns to improve vibration and cavitation, e.g., 75 microns, 50 microns, 25 microns, and all values therebetween. On the other hand, it also can be important to maintain a certain distance between the substrate being soldered and the tip to maximize the life of the tip as tip proximity to the substrate can affect tip wear. In general, the temperature during soldering is set at some level (e.g., a solder "offset" temperature) above the particular melt point of the particular solder composition employed in for the electrically conductive solder 160. For example, in some aspects a soldering temperature between 300° C. and 340° C. can be employed for solder compositions with melt points between 200° C. and 230° C., resulting in a solder offset temperature of about 100° C. to 110° C. In certain implementations, higher solder offset temperatures can be employed to increase the application rate of the solder 160. Further, those with ordinary skill in the art can set or otherwise optimize the ultrasonic process parameters to form the electrically conductive solder 160 based on a consideration of one or more of the following: (a) solder tip-to-substrate work height; (b) solder tip construction; (c) solder tip wear; and (d) ultrasonic solder amplitude and frequency.

Figure 3B:
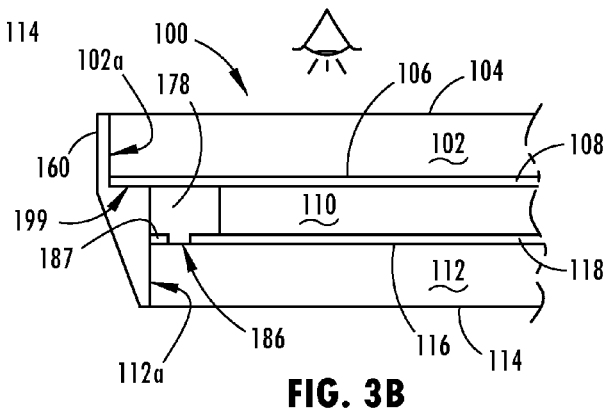
FIG. 3B is an enlarged, cross-sectional view of the electro-optic assembly depicted in FIG. 2, in accordance with another aspect of the disclosure.

Referring to FIG. 3B, an electro-optic assembly 100 is provided that includes: a front substrate 102 having a front substrate peripheral edge 102a, a first surface 104 and a second surface 106 substantially parallel to the first surface 104, wherein the second surface 106 comprises a first electrically conductive layer 108, 130 and a first isolation area 140 separating portions of the first electrically conductive layer 108, 130 (see also FIG. 2). The assembly 100 further includes a rear substrate 112 spaced from and arranged substantially parallel to the front substrate 102, the rear substrate 112 having a rear substrate peripheral edge 112a, a third surface 116, and a fourth surface 114 substantially parallel to the third surface 116, wherein the third surface 116 comprises a second electrically conductive layer 187 (if present), 118 and a second isolation area 186 separating portions of the second electrically conductive layer 187, 118 (see also FIG. 2). The assembly 100 also includes primary seals 175, 178 between the second and third surfaces 106 and 116, respectively, wherein the seals 175, 178 and the second and third surfaces 106 and 116, respectively, define a substantially hermetic cavity housing or otherwise containing the electro-optic medium 110. Further, an electrically conductive solder 160 is disposed on at least portions of the front and rear substrate peripheral edges 102a and 112a, respectively, in electrical contact with one of the first and second electrically conductive layers 108, 118, 130, 187. Further, the substrates 102, 112 are arranged such that at least a portion of one of the second and third surfaces 106 and 116, respectively, comprises one or more offset regions 199, and such that the conductive solder 160 is disposed on the offset regions 199.

The electrically conductive solder 160 employed in the electro-optic assembly 100 depicted in FIG. 3B has the same or similar function as the solder 160 employed in the assembly 100 depicted earlier in FIG. 3A. According to some implementations, the solder 160 in the assembly 100 depicted in FIG. 3B is disposed in contact with or otherwise on the offset regions 199 of the front substrate 102 and/or rear substrate 112. Offset regions 199 can be present on either or both of the substrates 102, 112 depending on the positions of the substrates relative to one another and their respective dimensions. Put another way, the solder 160 can be applied to cover and otherwise augment the primary seals 175, 178, particularly in configurations of assemblies 100 with offset regions. Further, the use of electrically conductive solder 160 as a means of interconnection between the assembly 100 and underlying device circuitry can advantageously reduce the necessary width of the offset region 199 (relative to other interconnection approach such as conductive epoxy/bus bar or electrical clip connection schemes) configured for interconnection purposes.

Figure 3C:
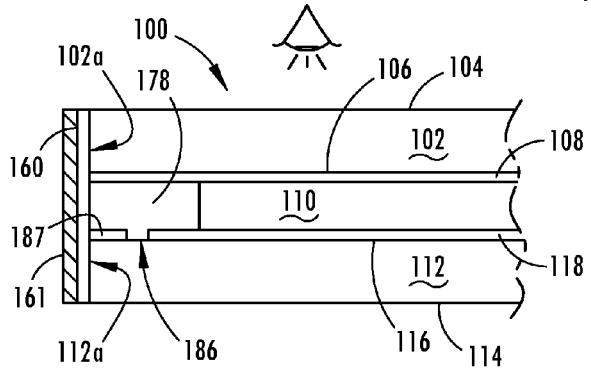
FIG. 3C is an enlarged, cross-sectional view of the electro-optic assembly depicted in FIG. 2, in accordance with a further aspect of the disclosure.
Figure 3D:
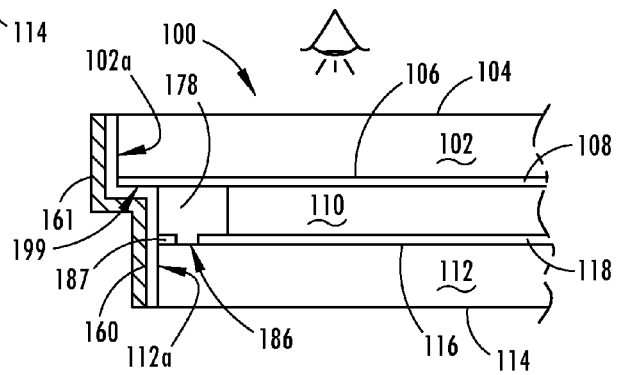
FIG. 3D is an enlarged, cross-sectional view of the electro-optic assembly depicted in FIG. 2, in accordance with an aspect of the disclosure.

Referring to FIGS. 3C and 3D, electro-optic assemblies 100 are depicted with similar configurations as the assemblies 100 depicted in FIGS. 3A and 3B with and without offset regions 199, respectively. The assemblies 100 depicted in FIGS. 3C and 3D, however, further include electrically conductive foils 161 disposed in contact with or otherwise on a portion of the electrically conductive solder 160. These foils 161 can serve to augment the electrical conduction path and thereby reduce the resistance between the interconnection(s) employed to connect the solder 160 to a PCB, electronic device or circuit behind or in proximity to the electro-optic assembly within, for example, the display device (not shown) housing the assembly 100. The foils 161 can also serve to augment the hermeticity of the cavity within the assembly 100 holding the electro-optic medium 110. Foils 161 can comprise any of a number of materials that are substantially electrically conductive, e.g., gold-plated metal foil. Preferably, the foil 161 is comprised of a composition having an electrical conductivity that exceeds that of the electrically conductive solder 160. It is also preferable to select a composition for the foil 161 such that its coefficient of thermal expansion is compatible to that of the substrates 102, 112. Accordingly, in some aspects, foil 161 can comprise metals or metal alloys, such as dumet, Pt, Ti, Kovar®, Cu/Mo/Cu laminates and others. Further, foils 161 can include various structures and forms including metal layers, metal sections, multilayer structures, films, coatings and the like. In some implementations, the foil 161 comprises a foil structure having a thickness of 250 microns or less.

With regard to the configurations of the electro-optic assemblies 100 depicted in FIGS. 3A-3D, other variant implementations of the primary seal 175, 178 and solder 160 regions can be realized. For example, ink and/or metal can be applied to the corners at the peripheral edges of the substrate 102a such that it is in contact with the solder 160 in these regions. The ink, for example, can comprise opaque, black or other colorants such that it functions to mask to the solder 160 and primary seals 175, 178 (and edges associated with these materials) from view by an observer. The masking effect can be realized to the extent that the ink or the like is colored appropriate to match the appearance of other features of the device as viewed by the outside observer such that the edges, demarcations and lines associated with the solder 160 and primary seals 175, 178 are not otherwise discernible. When metal films, layers or structures (e.g., a chrome-containing layer) are employed, these materials can be employed to effectively mask the solder 160 and primary seals 175, 178. Here, the metal films and the like are readily viewable by the outside observer as a ring that masks the seal/solder features beneath it within the assembly. A conductive ink could also be applied on the perimeter edge of substrates 102 and/or 112 such that the ink wraps around to edges 102a and/or 112a of the substrates and supplements the electrical contract between solder 160 and conductive layers 108, 118 and/or 187. Further, as understood by those with ordinary skill in the art, additional steps can be taken to improve the electrical contact between the solder 160 and conductive layers 108, 118 and/or 187 (e.g., selective application of conductive ink, pre-soldering substrate surface treatments, and others) depending on the particular application requirements of the electro-optic assembly 100.

With further regard to the electro-optic assemblies 100 depicted in FIGS. 3A-3D, coatings, such as Ag-based compositions or other coatings containing conductive particles or nanoparticles (e.g., particles and nanoparticles comprising Ag, Cu, Ni, C, or metal-coated C compositions and structures), can be employed on one or more surfaces of the assembly 100 in contact with the solder 160 to facilitate and enhance bonding strength between the solder 160 and these surfaces. For example, such bond-enhancing coatings can be applied to one or more peripheral edges 102a, 112a, offset 199, and electrode portions 108, 118 that are in contact with solder 160 in certain aspects. These bond-enhancing coatings can be selected based on surface energy, thermal expansion mismatch, and other considerations that can influence the bond integrity between the solder 160 and the regions of the assembly 100 in contact with it.

Still referring to FIGS. 3A-3D, according to another implementation of the electro-optic assembly 100, the solder 160 is employed in contact with only one or none of the peripheral edges 102a, 112a of the substrates 102, 112. In these aspects, the solder 160 serves as an electrical connection to one or more of the electrically conductive layers 108, 118, 130 and/or 187 on the second and/or third surfaces 106 and 116, respectively. But, in at least some of these aspects, the solder 160 may not augment the hermeticity of the primary seals 175, 178 that define the cavity containing the electro-optic medium 110 because it does not seal or completely span the substrates 102, 112. In other implementations, a conductive bridging material (e.g., a material that comprises conductive beads, conductive ink, conductive epoxy, or the like) can be placed between the solder 160 and one or more of the primary seals 175, 178 to form the electrical connections between the electrodes on the second and third surfaces 106, 116. The solder 160 can then be used as an electrical contact for the substrates 102, 112, respectively, depending on the location of the solder 160 in contact with the electrodes on the second or third surfaces of these substrates.

Figure 4:
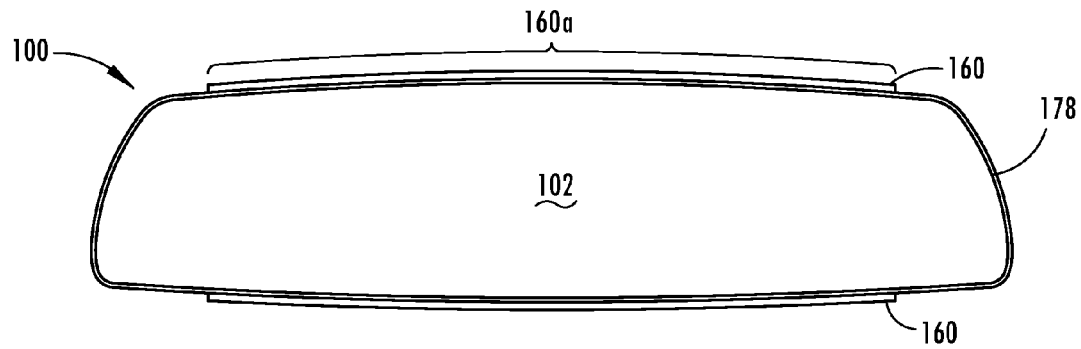
FIG. 4 is a top-down, plan view of an electro-optic assembly, in accordance with one aspect of the disclosure.
Figure 5A:
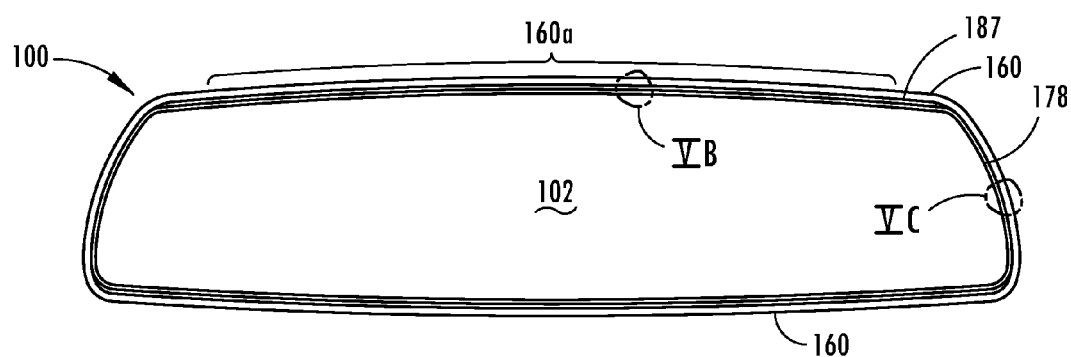
FIG. 5A is a top-down, plan view of an electro-optic assembly, in accordance with a further aspect of the disclosure.
Figure 5B:
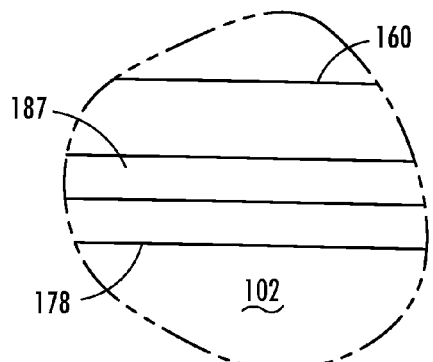
FIGS. 5B and 5C are enlarged views of solder-primary seal regions of the electro-optic assembly depicted in FIG. 5A.
Figure 5C:
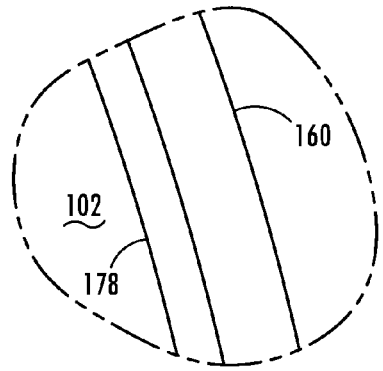
Figure 6:
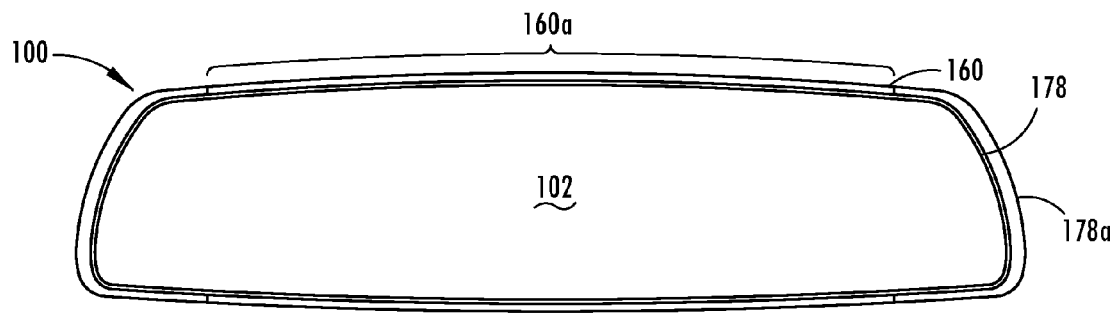
FIG. 6 is a top-down, plan view of an electro-optic assembly, in accordance with another aspect of the disclosure.

Referring to FIGS. 4-6, various configurations of electro-optic assemblies 100 are depicted in a top-down, cross-sectional orientation for purposes of demonstrating aspects of the disclosure with regard to interconnections to the solder-seal regions at the periphery of the assemblies. It should be understood that the various configurations of the substrates, with and without offset regions 199 and foils 161 described earlier in connection with FIGS. 3A-3D are also suitable for the solder-seal configurations depicted in FIGS. 4-6. In FIG. 4, an electro-optic assembly 100 is depicted according to an aspect in which the electrically conductive solder 160 is located only in an electrical contact area 160a. Accordingly, the solder 160 augments the hermeticity of the primary seal 178 (and the primary seal 175, not shown) in the electrical contact area 160a. Conductive solder 160 extends around the corners of the assembly 100 such that it augments the hermeticity of primary seals 175, 178. In particular, conductive solder 160 can extend to over at least 70% of the perimeter seal area, preferably at least 80% of the perimeter area and, most preferably, to at least 90% of the perimeter seal area.

With regard to FIG. 5A, an electro-optic assembly 100 is depicted according to another aspect in which the electrically conductive solder 160 is located around the entire periphery of the assembly 100. In this configuration, the electrically conductive layers, e.g., layer 187, arranged in connection with the solder 160 are only extended in the electrical contact area 160a of the assembly 100 (see FIG. 5B). In areas away from the contact area 160a, the solder 160 is placed in contact with the primary seal 178 (see FIG. 5C). An advantage of this configuration is that the solder 160 provides augmented hermeticity to the cavity containing the electro-optic medium around the full periphery of the assembly 100.

Referring to FIG. 6, an electro-optic assembly 100 is depicted according to an additional aspect in which the electrically conductive solder 160 is also located only in an electrical contact area 160a. Accordingly, the solder 160 augments the hermeticity of the primary seal 178 (and the primary seal 175, not shown) in the electrical contact area 160a. In other regions of the assembly 100 outside and/or adjacent to the contact area 160a, the primary seals 175, 178 are augmented by the inclusion of an additional sealing material 178a. The additional sealing material 178, preferably comprising a fast-cure polymeric material, can further enhance the hermeticity of the cavity containing the electro-optic medium 110 (not shown).

Figure 7A:
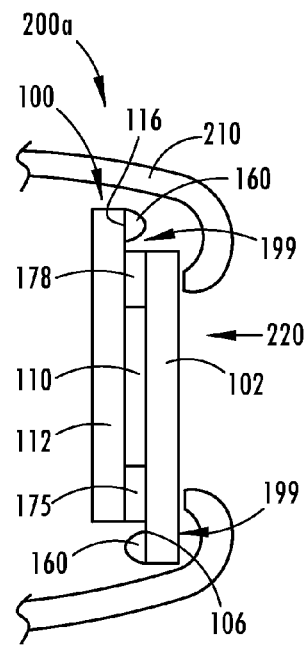
FIG. 7A is cross-sectional view of a rearview display device assembly, in accordance with an aspect of the disclosure.
Figure 7B:
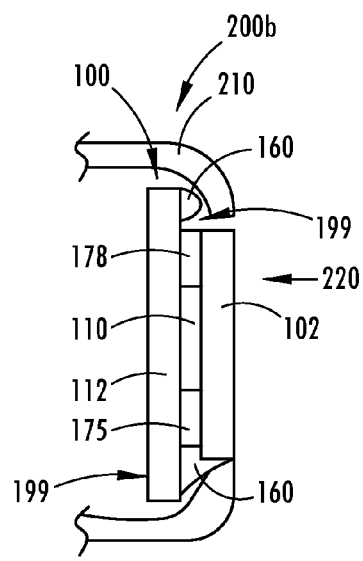
FIG. 7B is cross-sectional view of a rearview display device assembly, in accordance with an additional aspect of the disclosure.
Figure 7C:
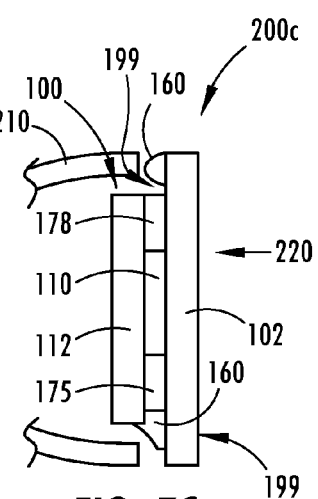
FIG. 7C is cross-sectional view of a rearview display device assembly, in accordance with a further aspect of the disclosure.

Referring to FIGS. 7A-7C, vehicular rearview assemblies 200a, 200b and 200c, respectively, are depicted according to various aspects of the disclosure. The rearview assembly 200a-200c configurations can employ any of the various electro-optic assemblies 100 outlined in the disclosure. Each of these rearview assemblies possesses a front portion 220 that would typically face an outside observer. For example, the rearview assemblies can be configured to function as a dimmable rearview mirror assembly for use in the interior of a vehicle with dimming capability based on input from a light sensor.

With regard to FIGS. 7A-7C, the vehicular rearview assemblies 200a, 200b and 200c possess a front portion 220. The assemblies include a front substrate 102 having a front substrate peripheral edge 102a, a first surface 104 and a second surface 106 substantially parallel to the first surface 104, wherein the second surface 106 comprises a first electrically conductive layer 108, 130 and a first isolation area 140 separating portions of the first electrically conductive layer 108, 130 (see also FIG. 2 for features of the assembly 100 not depicted in FIGS. 7A-7C). The assemblies 200a, 200b and 200c also include a rear substrate 112 spaced from and arranged substantially parallel to the front substrate 102, the rear substrate 112 having a rear substrate peripheral edge 112a, a third surface 116, and a fourth surface 114 substantially parallel to the third surface 116, wherein the third surface 116 comprises a second electrically conductive layer 118, 187 and a second isolation area 186 separating portions of the second electrically conductive layer 118, 187 (see also FIG. 2).

Still referring to FIGS. 7A-7C, the rearview assemblies 200a, 200b and 200c further include a primary seal 175, 178 between the second and third surfaces 106 and 116, respectively, wherein the seals 175, 178 and the second and third surfaces 106 and 116, respectively, define a substantially hermetic cavity. The electro-optic medium 110 is at least at least partially disposed in the cavity. The assemblies further include a housing structure 210 having an aperture corresponding to the front portion 220 of the vehicular rearview assembly, wherein at least a portion of the housing structure 210 is configured to support or adhere to at least one of the substrates 102, 112. The assemblies also possess an electrically conductive solder 160 that is disposed on at least portions of the front and rear substrate peripheral edges 102a, 112a in electrical contact with one of the first and second electrically conductive layers 106, 118, 130 and/or 187. In some implementations, the substrates 102, 112 are arranged such that at least a portion of one of the second and third surfaces 106 and 116, respectively, comprise an offset region 199. It should be noted that if substrate 102 is larger than substrate 112 (e.g., as the substrates 102, 112 depicted in FIG. 7C), a housing structure similar to the housing structure 210 shown in FIG. 7B may also be employed. In such a configuration, the housing structure 210 can be configured to contact substrate 102 and is substantially flush with the front surface of substrate 102.

Advantageously, the electro-optic assemblies 100, 200a-200c each possess various advantages in terms of their incorporation of electrically conductive solder 160. One advantage is that these assemblies generally require lower sealing material costs compared to more expensive concepts that rely on electrical contacts in contact with silver- other precious-metal containing conductive epoxies. Another advantage of these assemblies is that they do not require the use of electrical clips or bus bars for electrical connections between the assemblies and underlying device circuitry. This is because printed circuit boards, for example, can be directly connected to the electrically conductive solder 160 incorporated into these assemblies. To the extent bus bars are employed within the device containing the electro-optic assemblies of this disclosure, they are advantageously connected to the solder toward the end of the overall manufacturing process, which can result in an overall manufacturing cost savings. A further advantage of the electro-optic assemblies of this disclosure is that the use of electrically conductive solder 160 can effectively reduce the width and extent of spectral filters (e.g., spectral filter 196 and portions 124, 136) necessary to mask non-aesthetic features that would otherwise be viewable through the substrates by virtue of eliminating the need for electrical clips and/or conductive epoxy as a means for interconnection to underlying circuitry within the device employing the electro-optic assembly 100. It should also be appreciated by those skilled in the art that the electro-optic assemblies 100, 200*a*, 200*b* and 200*c*, and their variants consistent with the disclosure, can have additional or alternative advantages. It should further be appreciated by those skilled in the art that the above-described components can be combined in additional or alternative ways not explicitly described herein.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. An electro-optic assembly, comprising:
    a first substantially transparent substrate comprising:
        a first surface,
        a second surface,
        a first peripheral edge, and
        wherein the second surface comprises a first electrically conductive layer and a first isolation area separating portions of the first electrically conductive layer;
    a second substrate comprising:
        a third surface,
        a fourth surface,
        a second peripheral edge, and
        wherein the third surface comprises a second electrically conductive layer;
    a primary seal between the second and third surfaces, wherein the seal and the second and third surfaces define a substantially hermetic cavity;
    an electro-optic medium at least partially disposed in the cavity; and
    an electrically conductive solder that is disposed on at least portions of at least one of the first and second peripheral edges in electrical contact with one of the first and second electrically conductive layers
    wherein the electrically conductive solder has a composition suitable for bonding the solder with an ultrasonic solder bonding process to the at least portions of the first and second peripheral edges in electrical contact with one of the first and second electrically conductive layers.

2. The electro-optic assembly of claim 1, wherein a portion of the electrically conductive solder is disposed between the second and third surfaces to define at least a portion of the substantially hermetic cavity.

3. The electro-optic assembly of claim 1, wherein an electrically conductive foil is disposed on at least a portion of the electrically conductive solder.

4. The electro-optic assembly of claim 1, wherein the composition comprises at least 90% tin, 1% zinc and 1% antimony by weight.

5. The electro-optic assembly of claim 1, wherein the primary seal has an average width along the second and third surfaces of about 2.0 mm or less.

6. An electro-optic assembly, comprising:
    a front substrate having a front substrate peripheral edge, a first surface and a second surface substantially parallel to the first surface, wherein the second surface comprises a first electrically conductive layer and a first isolation area separating portions of the first electrically conductive layer;
    a rear substrate spaced from and arranged substantially parallel to the front substrate, the rear substrate having a rear substrate peripheral edge, a third surface, and a fourth surface substantially parallel to the third surface, wherein the third surface comprises a second electrically conductive layer;
    a primary seal between the second and third surfaces, wherein the seal and the second and third surfaces define a substantially hermetic cavity;
    an electro-optic medium at least partially disposed in the cavity; and
    an electrically conductive solder that is disposed on at least portions of at least one of the front and rear substrate peripheral edges in electrical contact with one of the first and second electrically conductive layers,
    wherein the substrates are arranged such that at least a portion of one of the second and third surfaces comprises an offset region, and
    wherein the electrically conductive solder has a composition suitable for bonding the solder with an ultrasonic bonding process to the at least portions of the first and second peripheral edges in electrical contact with one of the first and second electrically conductive layers.

7. The electro-optic assembly of claim 6, wherein a portion of the electrically conductive solder is disposed between the second and third surfaces to define at least a portion of the substantially hermetic cavity.

8. The electro-optic assembly of claim 6, wherein an electrically conductive foil is disposed on at least a portion of the electrically conductive solder.

9. The electro-optic assembly of claim 6, wherein the composition comprises at least 90% tin, 1% zinc and 1% antimony by weight.

10. The electro-optic assembly of claim 6, wherein a portion of the third surface comprises the offset region and the electrically conductive solder is further disposed on the offset region.

11. The electro-optic assembly of claim 6, wherein a portion of the second surface comprises the offset region and the electrically conductive solder is further disposed on the offset region.

12. The electro-optic assembly of claim 6, wherein portions of the second and third surfaces comprise respective offset regions and the electrically conductive solder is further disposed on the offset regions.

13. The electro-optic assembly of claim 6, wherein the primary seal has an average width along the second and third surfaces of about 2.0 mm or less.

14. A vehicular rearview assembly having a front portion, comprising:
    a front substrate having a front substrate peripheral edge, a first surface and a second surface substantially parallel to the first surface, wherein the second surface comprises a first electrically conductive layer and a first isolation area separating portions of the first electrically conductive layer;

a rear substrate spaced from and arranged substantially parallel to the front substrate, the rear substrate having a rear substrate peripheral edge, a third surface, and a fourth surface substantially parallel to the third surface, wherein the third surface comprises a second electrically conductive layer;

a primary seal between the second and third surfaces, wherein the seal and the second and third surfaces define a substantially hermetic cavity;

an electro-optic medium at least partially disposed in the cavity;

a housing structure having an aperture corresponding to the front portion of the vehicular rearview assembly, wherein at least a portion of the housing structure is configured to support at least one of the substrates; and an electrically conductive solder that is disposed on at least portions of at least one of the front and rear substrate peripheral edges in electrical contact with one of the first and second electrically conductive layers, wherein the substrates are arranged such that at least a portion of one of the second and third surfaces comprises an offset region, and wherein the electrically conductive solder has a composition suitable for bonding the solder with an ultrasonic bonding process to the at least portions of the first and second peripheral edges in electrical contact with one of the first and second electrically conductive layers.

15. The vehicular rearview assembly of claim 14, wherein a portion of the electrically conductive solder is disposed between the second and third surfaces to define at least a portion of the substantially hermetic cavity.

16. The vehicular rearview assembly of claim 14, wherein an electrically conductive foil is disposed on at least a portion of the electrically conductive solder.

17. The vehicular rearview assembly of claim 14, wherein the composition comprises at least 90% tin, 1% zinc and 1% antimony by weight.

18. The vehicular rearview assembly of claim 14, wherein a portion of the third surface comprises the offset region and the electrically conductive solder is further disposed on the offset region.

19. The vehicular rearview assembly of claim 14, wherein a portion of the second surface comprises the offset region and the electrically conductive solder is further disposed on the offset region.

20. The vehicular rearview assembly of claim 14, wherein portions of the second and third surfaces comprise respective offset regions and the electrically conductive solder is further disposed on the offset regions.

21. The vehicular rearview assembly of claim 14, wherein the primary seal has an average width along the second and third surfaces of about 2.0 mm or less.

22. The vehicular rearview assembly of claim 14, wherein the substrates are arranged according to their respective dimensions such that at least a portion of one of the second and third surfaces comprises an offset region.

* * * * *